United States Patent [19]

O'Shaughnessey

[11] Patent Number: 4,947,306
[45] Date of Patent: Aug. 7, 1990

[54] SUPPORT MEMBER FOR A HEADLAMP ASSEMBLY

[75] Inventor: Michael E. O'Shaughnessey, Fort Wayne, Ind.

[73] Assignee: General Motors Corporation, Detroit, Mich.

[21] Appl. No.: 386,166

[22] Filed: Jul. 28, 1989

[51] Int. Cl.⁵ .............................................. F21M 3/18
[52] U.S. Cl. ...................................... 362/421; 362/66; 362/271; 362/285; 362/287
[58] Field of Search ........................ 362/61, 66, 69, 70, 362/80, 269, 271, 272, 273, 285, 287, 289, 275, 419, 421, 429, 430

[56] References Cited

U.S. PATENT DOCUMENTS 4,774,639 9/1988 Baur et al. .............................. 362/66
4,884,174 11/1989 Dorleans .......................... 362/421 X Primary Examiner—Stephen F. Husar
Attorney, Agent, or Firm—Edward J. Biskup

[57] ABSTRACT

A headlamp assembly which includes a separate support member located between a headlamp and a mounting bracket secured to the vehicle and which has the lower portion thereof formed so that the lower portion of the headlamp can be connected thereto through a tongue and groove arrangement while the upper portion of the headlamp is connectable to the upper portion of the support member through a pair of removable fastener members.

4 Claims, 3 Drawing Sheets

SUPPORT MEMBER FOR A HEADLAMP ASSEMBLY

This invention concerns vehicle headlamps and more particularly a support member interposed between a headlamp and a mounting bracket fixed to the front of a vehicle for supporting the headlamp while the latter is adjusted about mutually perpendicular aim axes.

More specifically, the support member according to the present invention is generally L-shaped in configuration and has three sockets formed therein for receiving a pair of longitudinally adjustable bulb pivots and a fixed bulb pivot, all of which are carried by the mounting bracket secured to the vehicle. In addition, the lower portion of the support member is formed with a pocket member that allows a projection integral with the lower portion of the headlamp to be received by the pocket member and afterwards tilted into an upright position and secured to the upper panel of the support member by a pair of shafts accessible from above the headlamp. Thus, if the headlamp subsequently needs to be removed from the vehicle or if the lamp bulbs carried by the headlamp need replacement, it is a simple matter to pull the two shafts to release the headlamp from the support member.

The objects of the present invention are to provide a new and improved support member for a headlamp that facilitates replacement of the headlamp and/or the lamp bulbs mounted in the headlamp; to provide a new and improved support member that is carried by the adjustable and fixed pivot balls which form a part of the mounting bracket secured to the front vehicle and that supports the headlamp for movement about a horizontal aim axis and a vertical aim axis and allows the headlamp to be readily released from the support member by removing a pair of shafts accessible from above the headlamp; to provide a new and improved headlamp support member interposed between a headlamp and a mounting bracket secured to the front of the vehicle and serving to removably support the headlamp through a pair of threaded shafts; and to provide a new and improved headlamp assembly which includes a separate support member located between a headlamp and the mounting bracket secured to the vehicle and which has the lower portion thereof formed so that the lower portion of the headlamp can be connected thereto through a tongue and groove arrangement while the upper portion of the headlamp is connectable to the upper portion of the support member through a pair of removable fastener members.

A patent that discloses a support member for a headlamp that has certain similarities to the present invention can be seen in U.S. Pat. No. 4,774,639 which issued on Sept. 27, 1988.

Other objects and advantages of the present invention will be more apparent from the following detailed description when taken with the drawings in which FIG. 1 is an exploded perspective view showing the various parts of a headlamp assembly including the support member according to the present invention for the headlamp;

Figure 1:
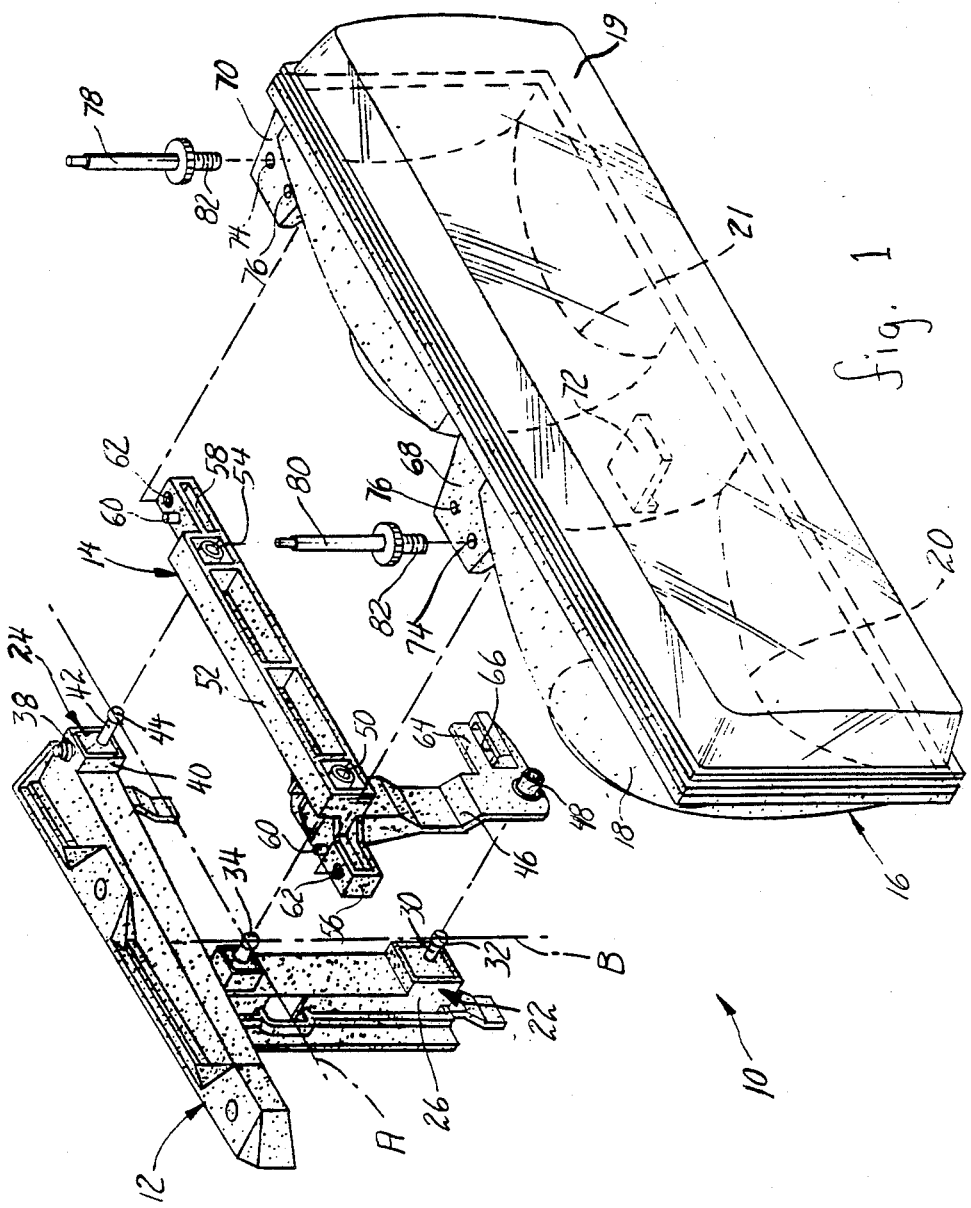
Figure 2:
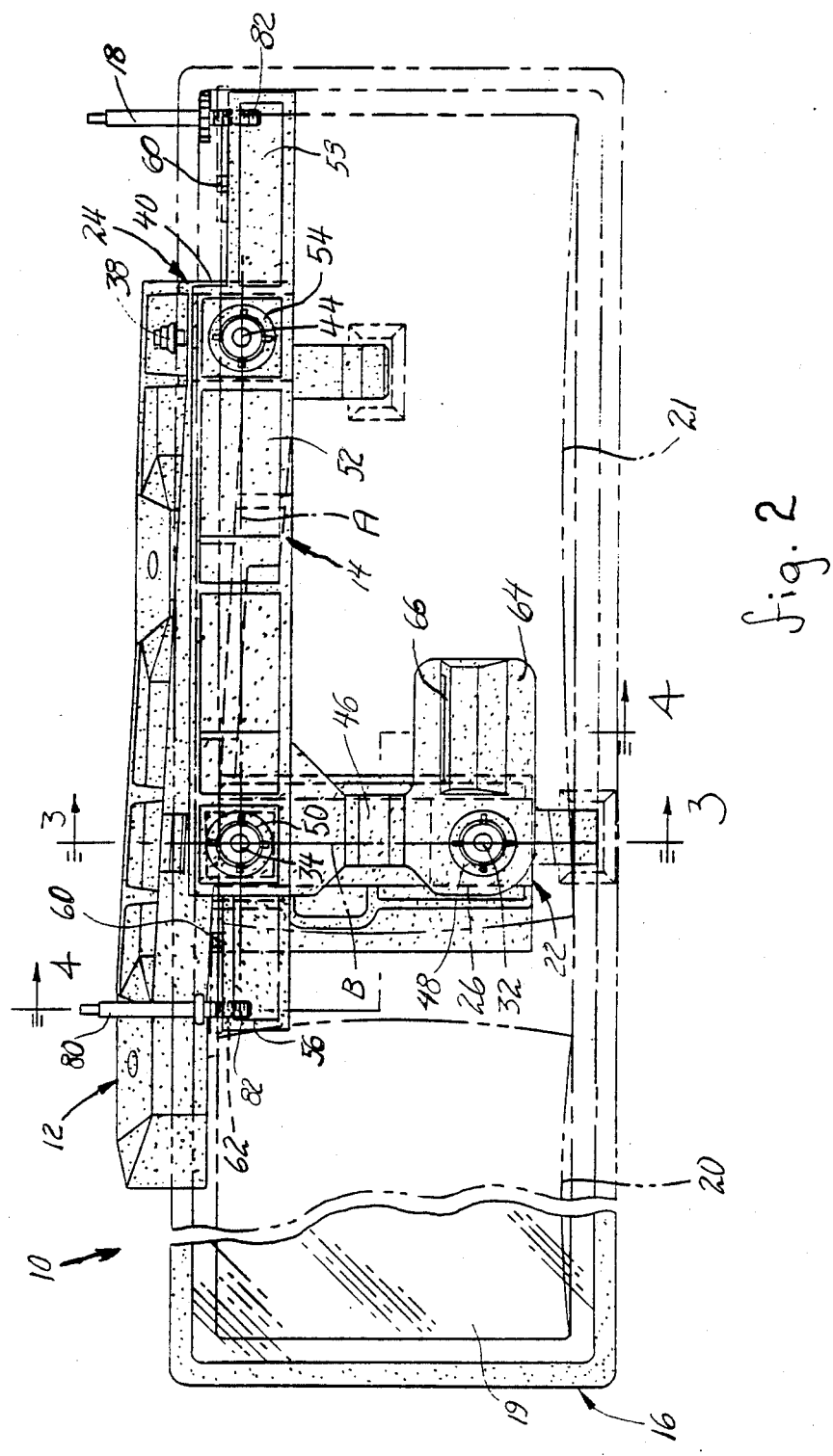
FIG. 2 is a front elevational view showing the various parts of the headlamp assembly of FIG. 1 interconnected for allowing adjustable movement of the headlamp about a vertical aim axis and a horizontal aim axis.

Referring now to the drawings and more particularly FIGS. 1 and 2 thereof a headlamp assembly 10 is shown of the replaceable light bulb composite type. The headlamp assembly 10 includes a mounting bracket 12 which connects through a support member 14 to a headlamp body 16 for a selective adjustable movement of the lamp body 16 in a horizontal plane containing a horizontal aim axis A and a vertical plane containing a vertical aim axis B. The lamp body 16 includes a plastic reflector member 18 enclosed by a glass or the like lens 19 and formed with a pair of side by side parabolic cavities 20 and 21 the concave surfaces of each of which is aluminized so as to project a light beam forwardly of the vehicle.

The mounting bracket 12 is made of a plastic material and is adapted to be secured to the sheet metal of the motor vehicle (not shown) at the front end thereof and has a main body portion that is generally T-shaped as best seen in FIG. 1. The mounting bracket 12 is similar to that seen in copending U.S. patent application Ser. No. 237,805 filed on Aug. 29, 1988, now abandoned, in the name of Van Duyn et al and entitled Mounting Bracket For Headlamp Assmbly. The mounting bracket 12 includes a pair of laterally spaced adjustment mechanisms 22 and 24 for positioning the lamp body 16 about the aforementioned aim axes A and B. The adjustment mechanism 22 is located within the vertical leg portion of the mounting bracket 12 while the adjustment mechanism 24 is located at the terminal end of the horizontal leg portion of the mounting bracket 12.

Figure 3:
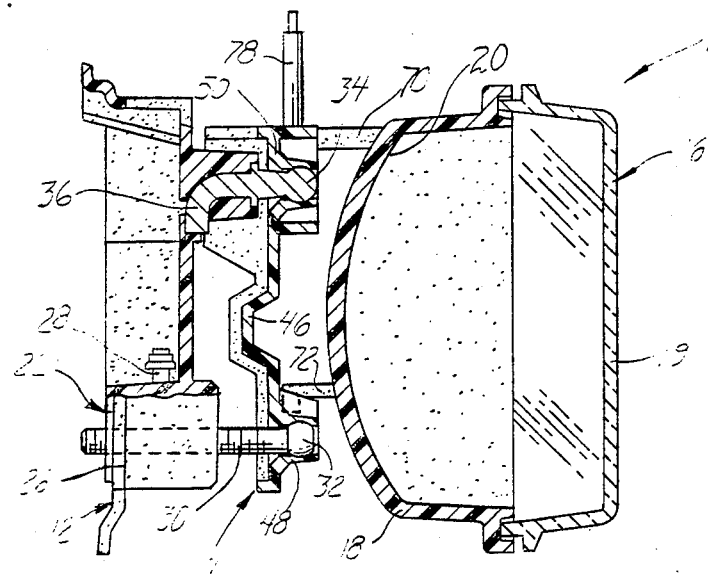
FIG. 3 is an elevational sectional view of the headlamp assembly taken on line 3—3 of FIG. 2.

As best seen in FIG. 3, the adjustment mechanism 22 is located within a housing 26 which projects forwardly outwardly from and is integral with the lower end of the vertical leg portion of the mounting bracket 12. The housing 26 contains the usual bevel gears as seen in FIG. 5 of the U.S. Pat. No. 4,742,435 issued May 3, 1988 so as to convert manual rotatable movement of a shaft 28 into longitudinal movement of a threaded shaft 30 the front end of which is integrally formed with a ball pivot member 32. The upper end of the vertical leg portion carries a ball pivot member 34 which is integral with L-shaped shaft 36 fixedly molded in the associated leg portion. Thus, the centers of the ball pivot member 32 and 34 define the vertical aim axis B about which the lamp body 16 is adjustable by the adjustment mechanism 24. In this regard, it will be noted that adjustment mechanism 24 also has a vertical shaft 38 the lower end of which connects through a bevel gear arrangement located within a housing 40 which forms an integral part of the terminal end of the horizontal portion of the mounting bracket 12. The bevel gear arrangement transmits drive to a longitudinally movable threaded shaft 42 which is integral with a ball pivot member 44. Also, the centers of the ball pivot members 34 and 44 define the horizontal aim axis A about which the lamp body 16 is adjustable by the adjustment mechanism 22.

Rather than having the ball pivot members 32, 34, 44 connected directly to the lamp body 16 in the manner of the above referred to patent application, in this instance, and in accordance with the invention, the support member 14 is interposed between the mounting bracket 12 and the lamp body 16. As in the case of the mounting bracket 12, the support member 14 has a main body portion that is generally T-shaped and is molded from a plastic material as seen in FIGS. 1 and 2. As seen in FIG. 3, the vertical leg portion 46 of the support member 14 is formed with a pair of sockets 48 and 50 which receive the ball pivot members 32 and 34, respectively, in a snap action fashion. Similarly, the horizontal leg portion 52 of the support member 14 has a socket 54 molded therein which receives the ball pivot member 44 in a snap action fashion. The support member 14 also has a pair of laterally spaced arms 56 and 58 integrally formed with the horizontal leg portion 52. Each arm 56 and 58 has a locator pin 60 formed thereon adjacent to a threaded bore 62. The lower end of the vertical leg portion 46 also has a laterally outwardly extending arm 64 formed therewith that is formed with a slot or groove 66.

Figure 4:
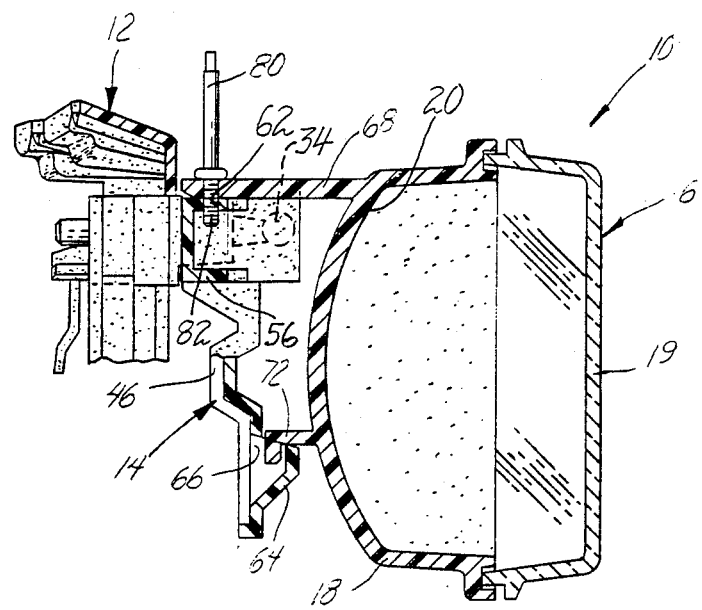
FIG. 4 is a similar view of the headlamp assembly taken on line 4—4 of FIG. 2.

The support member 14 described above is intended to be permanently connected to the ball pivot members 32, 34 and 44 while removably supporting the lamp body 16. To this end, it will be noted that the rear portion of the reflector member 18 is integrally formed at the upper portion thereof with a pair of rearwardly extending connector members 68 and 70 with connector member 70 located outboard of the cavity 21 while connector member 68 is located between the two cavities 20 and 21 of the reflector member 18. The connector members 68 and 70 are spaced from each other a distance which equals the spacing between the arms 56 and 58 formed on the support member 14. Also, as seen in FIGS. 1 and 4, below the connector member 68 a hook-shaped tang member 72 is integrally formed with the rear of the reflector member 18. Each of the connector members 68 and 70 is formed with a pair of throughbores 74 and 76. Through-bore 76, in each case, serves as a locator bore for purposes which will be expalined hereinafter.

From the above description, it should be apparent that in assembling the lamp body 16 to the support member 14 the tang member 72 is initially inserted into the groove 66 of the vertical leg portion 46 and the connector members 68 and 70 are positioned onto the arms 56 and 58 respectively of the support member 14 with the bores 76 each mating with the locator pins 60. Afterwards, a pair of identical lock pins 78 and 80 each having lower threaded portions 82 are inserted through the bores 74 into threaded engagement with the threaded bores 62 in the support member 14. In this manner the lamp body 16 is fixedly secured to the support member 14 as seen in FIGS. 2, 3 and 4. If for some reason it is necessary to remove the lamp body 16 from the support member 14, the lock pins 78 and 80 which are accessible from above the head lamps 16 are initially unthreaded from the support member 14 and the top of the lamp body 16 is tilted downwardly so as to free the tang member 72 from the slot 66 in the vertical leg portion 46.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A support member for interconnecting a headlamp to a mounting bracket for selective adjustable movement of said headlamp about a vertical aim axis and a horizontal aim axis, said mounting bracket being fixed to said motor vehicle and having a first longitudinally adjustable ball pivot and a fixed ball pivot the centers of both of which are located along said vertical aim axis, a second longitudinally adjustable ball pivot on said mounting bracket and having its center located along said horizontal aim axis, said support member being a unitary member having socket means for receiving said fixed ball pivot and said first and second ball pivots, and means for removably connecting said head lamp to said support member, said means including a pair of shaft members accessible from above the headlamp.

2. A support member for interconnecting a headlamp to a mounting bracket for selective adjustable movement of said headlamp about a vertical aim axis and a horizontal aim axis, said mounting bracket being fixed to said motor vehicle and having a first longitudinally adjustable ball pivot and a fixed ball pivot the centers of both of which are located along said vertical aim axis, a second longitudinally adjustable ball pivot on said mounting bracket and having its center located along said horizontal aim axis, said support member being a unitary member having socket means for receiving said fixed ball pivot and said first and second ball pivots, and means for removably connecting said head lamp to said support member, said means including a pair of screw members accessible from above the headlamp and a tongue and groove arrangement for connecting the lower portion of said headlamp to said support member.

3. A support member for interconnecting a headlamp to a mounting bracket for selective adjustable movement of said headlamp about a vertical aim axis and a horizontal aim axis, said mounting bracket being fixed to said motor vehicle and having a frist longitudinally adjustable ball pivot and a fixed ball pivot the centers of both of which are located along said vertical aim axis, a second longitudinally adjustable ball pivot on said mounting bracket and having its center located along said horizontal aim axis, said support member being a unitary plastic member having socket means for receiving said fixed ball pivot and said first and second ball pivots in a snap action fashion, and means for removably connecting said head lamp to said support member, said means including a pair of shaft members accessible from above the headlamp for connecting upper portions of said headlamp to said support member, and a tongue and groove connection for joining the lower portion of said headlamp to said support member.

4. The support member according to claim 3 wherein said means for removably connecting said headlamp to said support member includes locator pin means and locator bores.

* * * * *